United States Patent [19]
Hilliard et al.

[11] Patent Number: 6,073,755
[45] Date of Patent: Jun. 13, 2000

[54] CONVEYOR TENSIONING SYSTEM FOR A FOLDER APPARATUS

[75] Inventors: Michael W. Hilliard, Somersworth; Roger R. Belanger, Dover, both of N.H.

[73] Assignees: Heidelberg Web Press, Inc., Dover, N.H.; Heidelberger Druckmaschinen AG, Heidelberg, Germany

[21] Appl. No.: 08/891,668

[22] Filed: Jul. 11, 1997

[51] Int. Cl.[7] .................................................. B65G 23/44
[52] U.S. Cl. ........................ 198/813; 198/810.02; 198/817
[58] Field of Search .............................. 198/810.02, 813, 198/814, 817

[56] References Cited

U.S. PATENT DOCUMENTS 2,759,594  8/1956  Kleboe et al. ........................... 198/814
5,688,219  11/1997  Renard et al. ........................... 493/357

FOREIGN PATENT DOCUMENTS

| 368 469 | 10/1982 | Austria . |
| 24 47 156 | 4/1975 | Germany . |
| 19600379 | 9/1996 | Germany . |
| 2 299 327 | 10/1996 | United Kingdom . |

*Primary Examiner*—Jospeh E. Valenza
*Attorney, Agent, or Firm*—Kenyon & Kenyon

[57] ABSTRACT

A device for tensioning conveying systems for flat products in a folding apparatus includes a conveying system having a plurality of individual conveyors. The individual conveyors rotate about an endless path. A tensioning unit is assigned to each of the individual conveyors, each tensioning unit being pivotally mounted on a support allowing for quick break down detection of the individual conveyors.

8 Claims, 3 Drawing Sheets

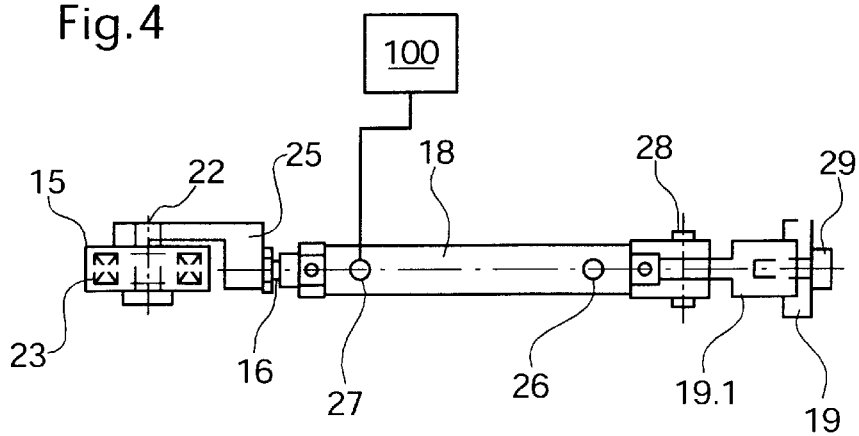
Fig.4
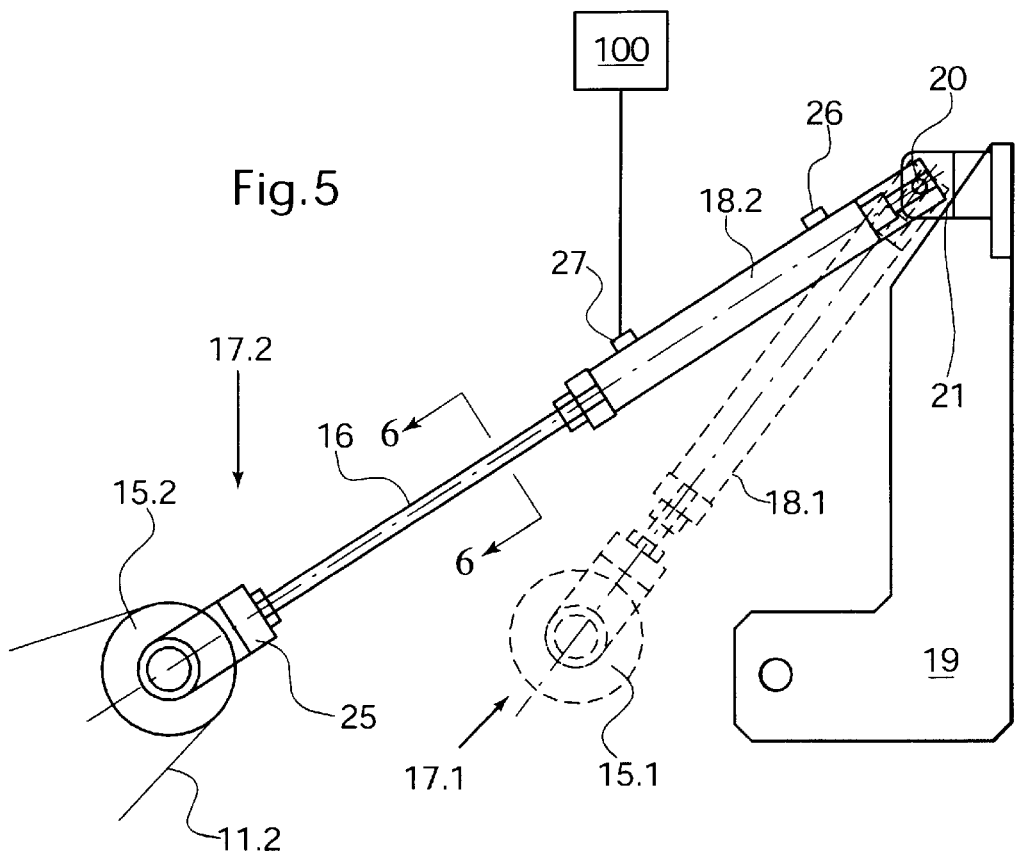
Fig.5
Fig.6

CONVEYOR TENSIONING SYSTEM FOR A FOLDER APPARATUS

FIELD OF THE INVENTION

The present invention is related to a conveyor tensioning system for a folder apparatus, particularly a folder apparatus having a product delivery using conveyor tapes.

BACKGROUND OF THE INVENTION

Great Britain Patent Application No. 2,299,327 discloses a belt transport system in a sheet folding apparatus. A plurality of transport belts each form a loop around a number of guide members and a cylinder. Tensioning devices are provided to adjust the tension in the belts. A single tensioning member, via a cantilever mechanism, adjusts the tension in the plurality of belts. To facilitate removal and replacement of worn transport belts, one end of each guide member and the corresponding end of the cylinder are disengageable from their mountings. The disengagement may be by axial separation of mountings away from the associated ends of the guide members and cylinder. The tensioning device is deactivated prior to belt removal to create slack in the belt thus facilitating removal. One of the guide members may take the form of coaxial pulleys for the individual belts. The cylinder to which the tapes are assigned may be, for example, a folding cylinder of a folding apparatus.

Known embodiments and implementations of tensioning devices include individual arms assigned to a common pivot axis. The common pivot arrangement suffers from the disadvantage that tensions from one tape to another can vary due to the lack of the individual tension control of tapes employing a common pivot axis. Tension adjustment in individual tapes is not provided by this arrangement. On the other hand, individual spring loaded tensioner arms are conceivable, but are difficult to design with close spacing to each other. Furthermore, the known implementations do not provide adequate space for easy tape changes.

A pivoting tensioner arrangement, as known in the prior art, requires relatively large amounts of space to take up increased tape slack. This is especially pertinent for two position tape path systems. That is, a tape system may include a first path around its respective rollers wherein one of the rollers assumes a first position that corresponds to an operating position. The roller may be adjustable to a second position which may correspond, for example, to a maintenance position or a second operating position. The roller's second position may create a shorter tape path than the roller's first position, in which case it is advantageous for the tape tensioners to take up the excess tape. A pivoting tensioner requires a radius through which the tensioner moves to take up the slack. It would be desirable to provide tensioning rollers that may take up the excess tape by substantially linear displacement, thus not requiring as much space as a pivoting system that includes radial lever arms and a radial motion. Further, due to wear of the tapes and dependent upon the slack requirement between the respective two positions, a correct tape tension is more difficult to maintain and adjust with a pivoting tape tensioning system compared with a tape tensioning system according to the present invention.

SUMMARY OF THE INVENTION

Accordingly, it is an object of the present invention to allow for an easy compensation for one tape length without any adjusting operation.

A further object of the present invention is to be able to change one tape without interfering with or changing the tension of the remaining tapes.

Another object of the present invention is to provide a visual identification of tapes that need to be replaced while other tapes remain tensioned and remain operative in an active state.

According to the present invention, a device for tensioning conveying systems for flat products in a folding apparatus includes a tensioning unit and roller assigned to each of a plurality of individual conveyors, the individual conveyors rotating about respective endless paths, the tensioning units being pivotally mounted on a support allowing for quick break down detection of the individual conveyors.

The present invention has many advantageous effects and results. Since more uniform tension from one tape to another can be maintained, a more uniform tape speed profile can be achieved. Because each tape has individual tension control, tapes of different widths may be used in one conveying system of a folding apparatus. Additionally, when changing one tape from a set of tapes, the remaining adjacent tapes may be kept under tension, and are therefore less prone to being inadvertently knocked out of place. For example, if one tape fails, breaks, or falls off, the remaining tapes can remain at their original tension. Therefore, a complete break down is much less likely as the remaining tapes may continue to transfer the products without causing a jam in the folder apparatus.

Another advantage of the present invention is that, if a tape fails, its respective actuating or tensioning unit drops out of alignment with the remaining actuating units into a static or inactive position. The inactive position provides a quick visual indication that maintenance is in order, such as a tension adjustment or a tape replacement for the respective conveyor unit. The tensioning units may be pivotally mounted on a support so that each tensioning unit can rotate into the visually apparent inactive position upon failure of a respective conveyor tape.

The tensioning units are mounted with sufficient space between successive units to provide access for inserting the tapes onto the tensioning units. When the conveyor tapes are properly tensioned for normal operation, the tensioning units adopt a first or active position. When a conveyor tape fails or breaks, the tensioning unit adopts the second or inactive position. The support upon which the tensioning units are mounted may include a stop to keep the tensioning units in their second position upon failure of an individual conveyor tape to thereby keep the actuating unit visible for the operator's inspection.

The tensioning member of the individual conveyor tapes may include, for example, a pneumatic cylinder connected to a regulated air pressure source. Pneumatic cylinders have the significant benefit of using a compressible fluid, i.e. compressed air, as the working fluid. Pneumatic cylinders therefore provide damping properties which smooth the conveyor operation, for instance, if products of varying thickness are conveyed through the tapes. Those of skill in the art will recognize that alternative tensioning members may also be used, such as hydraulic cylinders using substantially incompressible fluid and an expansion tank. Other possible arrangements include, for example, spring load systems, or mass and gravity tensioning systems.

BRIEF DESCRIPTION OF THE DRAWINGS

FIG. 4 is an enlarged top view of the support and a respective, pivotally mounted actuating unit according to an embodiment of the present invention; and FIG. 5 is an enlarged side view of the support and a respective, pivotally mounted actuating unit according to an embodiment of the present invention.

FIG. 6 is a cross-sectional view through line 6—6 in FIG. 5.

DETAILED DESCRIPTION OF THE INVENTION

Figure 1:
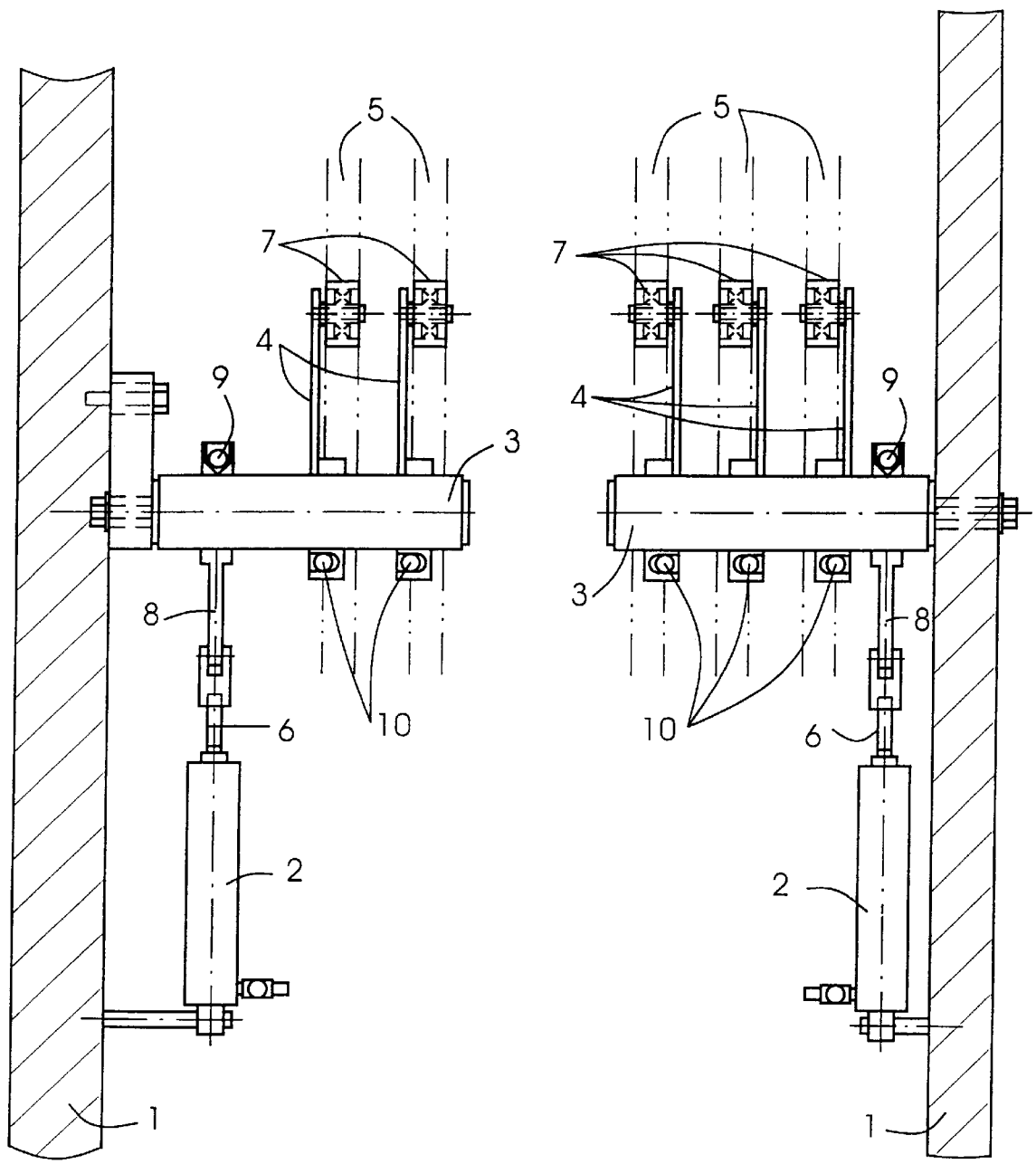
FIG. 1 is a schematic diagram of a conveying system tensioning device from the prior art.

FIG. 1 shows a schematic diagram of an existing conveying system tensioning device. The existing design shows two respective shafts 3 mounted in bushings on the sidewalls 1 of a folding apparatus. The shafts 3 are rotated by actuating units 2, from which rods 6 extend. The rods 6 are connected to levers 8 which rotate the shafts 3. The levers 8 are attached by clamps 9 to the circumference of the shafts 3. Both shafts 3 support respective levers 4, each lever 4 having a tape roller 7 assigned thereto, for tensioning the tapes 5 (shown schematically). The levers 4 are mounted on the respective shaft 3 by clamps 10, allowing for adjustment of the levers 4 on the shaft 3. Adjusting the tension of one of the respective tapes 5 requires an undesired adjustment of the tension of the remaining tapes 5. The tape rollers 7, being attached to shaft 3 by levers 4, will all be rotated when shaft 3 is turned. Therefore, adjusting only one of the tapes 5 causes an undesired manipulation of all the other tapes 5 on the common shaft 3.

Figure 2:
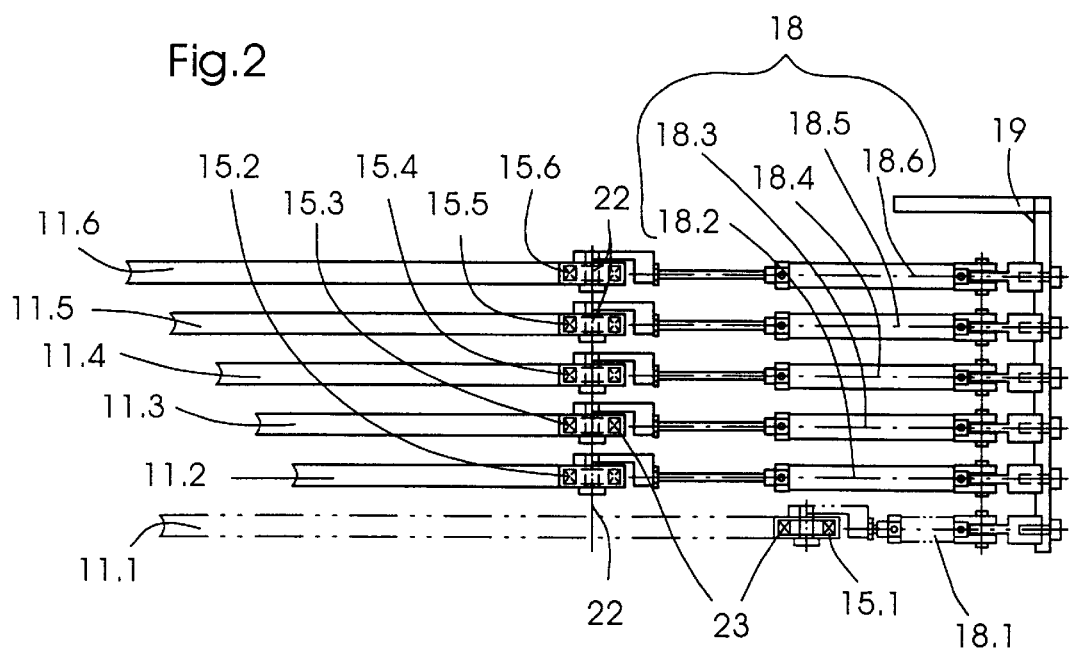
FIG. 2 is a top elevation of the conveyor system showing individual tensioning units arranged on a support according to an embodiment of the present invention.

FIG. 2 shows a top elevation of an exemplary embodiment of the conveyor system 11 for flat products 101 according to the present invention which includes, for example, a plurality of individual conveyors 11.1–11.6 embodied as tapes or belts. The individual conveyors 11.1–11.6 rotate about various rollers or disc-shaped elements, such as support rollers 13 and a drive roller 14. Included in the path of each individual conveyor 11.1–11.6 is, for example, a respective moveable tape roller 15.1–15.6 assigned to a rod 16 of a respective tensioning unit 18.1–18.6. The tape rollers 15.1–15.6 may be referred to collectively by reference numeral 15 and the tensioning units 18.1–18.6 may be referred to collectively by reference numeral 18.

Figure 3:
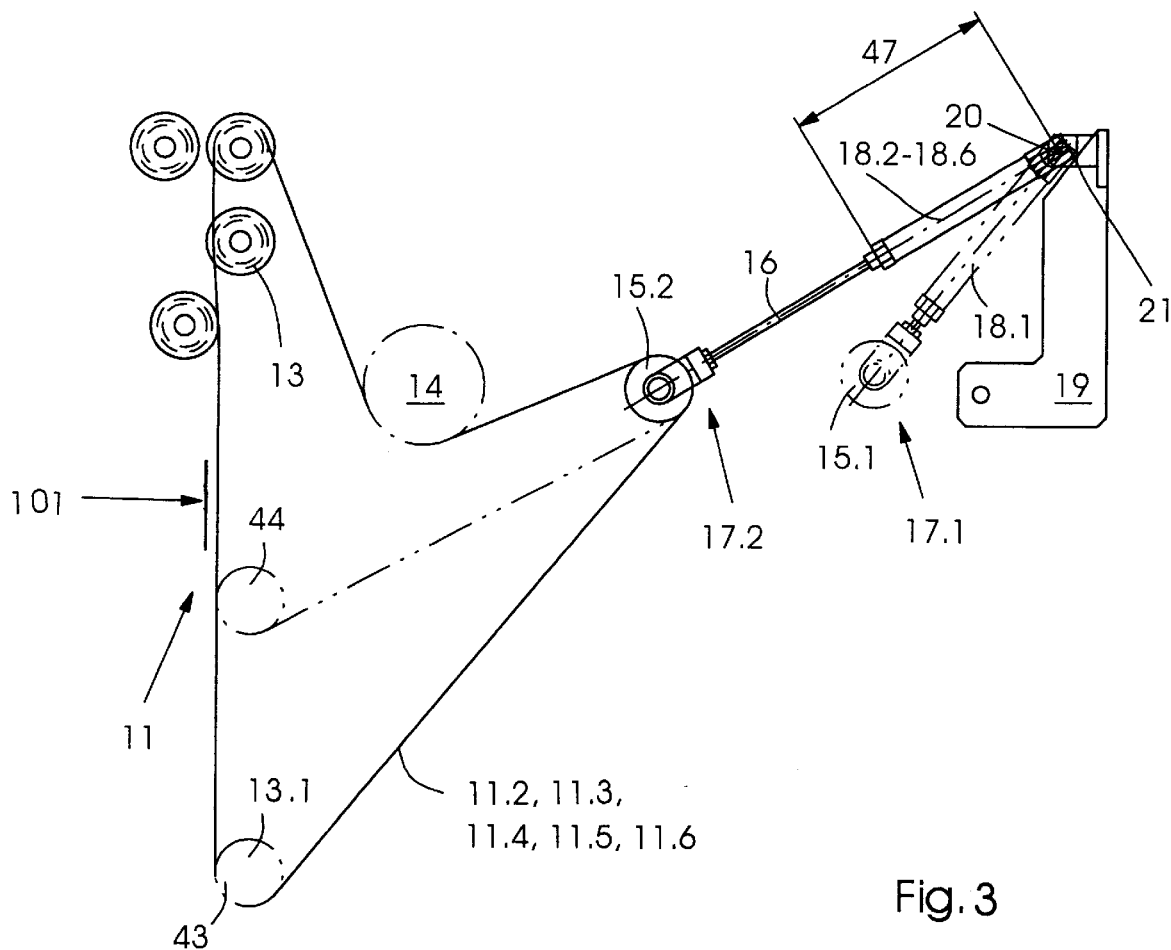
FIG. 3 is a side view of the conveyor system showing a closed path of the tapes.

A first or active position of the tensioning units 18 is identified by reference numeral 17.2 of FIG. 3. The tensioning units 18, pneumatic cylinders for example, are kept under regulated air pressure. Due to the regulated air pressure of the tensioning units 18, the moveable tape rollers 15 tension the respective individual conveyors 11.1–11.6. The tensioning units 18 are, for example, pivotally mounted on the support 19. By applying regulated air pressure to a tensioning unit 18, it will adopt a stable operating position 17.2. As can also be seen in FIGS. 2 and 3, the tensioning units 18 can adopt a second position 17.1, shown in dashed lines. In position 17.1, for example, the tensioning units 18 indicate a failure of their respective individual conveyor 11.1–11.6. Since the tensioning units 18 substantially align with each other in their first position 17.2 during normal operation, a slight deviation of one of the tensioning units 18 about its pivot axis 20 on support 19 indicates a maintenance requirement due to a loss of tension in a respective individual conveyor 11.1–11.6. Thus, by visual inspection, for example, the operator may determine if maintenance is required.

The right hand portion of FIGS. 2 and 3 shows the support 19 having, for example, a plurality of pivotally mounted tensioning units 18 attached thereto. Each of the tensioning units 18 comprises a tape roller 15 fastened to a respective rod 16. The plurality of individual conveyors 11.1–11.6 rotates about an axis of rotation 22. Because each tensioning unit 18.1–18.6 is individually attached to its respective tape roller 15.1–15.6, each tape roller 15 may have a different axis of rotation 22 from the other tape rollers 15. Each of the moveable tape rollers 15.1–15.6 is, for example, included in the endless path of a respective one of the individual conveyors 11.1–11.6, and exerts a tensioning force upon the respective conveyor 11.1–11.6 to establish the conveyor in the first or active position 17.2. The moveable tape rollers 15.1–15.6 are mounted, for example, by bearings 23 to a respective tensioning unit 18.1–18.6 for rotation about an axis 22.

In FIG. 3, tensioning unit 18.1 is shown in a second or deactivated position 17.1, in which the respective individual conveyor 11.1 has failed. The other tensioning units 18.2–18.6 are shown in active position 17.2 for which individual conveyors 11.2–11.6 are properly tensioned.

FIG. 4 shows a tensioning unit 18 in greater detail. For example, each tape roller 15 is mounted by bearings 23 on a tape roller support 25 which is fastened to the rod 16 of the tensioning unit 18. By means of a pressure inlet 27, for example, the tensioning unit 18 can be connected to a regulated air pressure source 100 to maintain pressure in the tensioning units 18. In order to allow air to escape, the upper portion of the tensioning unit 18 can include an opening 26 to the atmosphere. Thus, movement of the rod 16 and its associated piston assembly (not shown) within the tensioning unit 18 are free to move according to the preset regulated air pressure load. Furthermore, the rod 16 may, for example, have a non-rotating shape such as square (FIG. 6), hexagonal, oval, or other suitable shape, providing a non-rotating cross-sectional interface with the tensioning unit 18, to maintain the rollers 15 in alignment with the plane of the individual conveyors 11.1–11.6.

The tensioning units 18 can adopt, for example, a first or active position 17.2 or a second or deactivated position 17.1, as shown in FIG. 5. In the deactivated position 17.1, a tensioning unit 18 is out of alignment with the remaining active tensioning units 18, and can be, for example, visually detected by operating personnel as an indication that maintenance is required on the individual conveyor that is out of alignment. The tensioning units 18 can be pivotally mounted by a pin 28 secured in an intermediate bracket 19.1. As shown in FIG. 5, intermediate bracket 19.1 is slot mounted in support 19 providing an initial range of adjustment. Fastening screw 29 connects the intermediate bracket 19.1 to the support 19. The intermediate bracket 19.1 may include a stop 21, as shown in the side elevation of FIG. 5, to keep the respective tensioning units 18 in their second position 17.1, once the tensioning unit 18 has reached the second position 17.1 due to, for example, a failure of an individual conveyor 11.1–11.6.

Since the tensioning units 18 according to the present invention act independently of each other in maintaining the tension of the individual conveyors 11.1–11.6, the tension of each conveyor 11.1–11.6 can be controlled easily and accurately for each individual conveyor 11.1–11.6. By applying the tensions individually instead of groupwise, different tape widths can be used. In contrast, prior art designs lack individual tape tensioning and therefore cannot control the tension accurately for tapes of different widths. Having individually assigned tensioning units 18 also permits the changing of an individual conveyor 11.1–11.6 without disturbing the rest of the conveyors. Adjacent conveyor tapes that are in good condition are not affected because of a failure of one of the other conveyors 11.1–11.6. The apparatus according to the present invention also permits a quick visual identification of tapes that need replacement. Furthermore, the present invention allows the use of readily available, less expensive commercial parts instead of expensive custom machined parts.

As shown in FIG. 3, a two-position-path conveying system may include a two-position roller 13.1 that is positionable in a first position 43 and a second position 44. The first position 43 may be, for example, an operating position and the second position 44 a maintenance position. Typically, one of the positions shortens the tape path length, and consequently, the excess tape must be taken up. According to the present invention, cylinders 18 may be designed with a sufficient stroke length 47 such that the tensioning rollers 15.1–15.6 may take-up the excess tape as shown in FIG. 3. The system according to the present invention which utilizes, for example, the linear motion of an air cylinder, offers more tape take-up capabilities and is less space consuming than the conventional pivoting tensioning systems as are known in the art. For example, the shafts according to the prior art design are no longer necessary. Further, if a tape breaks during operation of the folding apparatus, but does not cause a jam, the remaining tapes can continue operating at the regulated tension according to the present invention, allowing the production run to finish without interruption.

Another significant advantage of the present invention is that there is no longer a need to adjust individual pivoting arm locations because proper tension is achieved by the respective individual tensioning units 18, that may be, for example, connected to a regulated air pressure. The tensioning units 18 place the tape rollers 15 in a stable position 17.2 during operation of the apparatus.

What is claimed is:

1. A device for a tensioning conveying system for conveying flat products in a folding apparatus, the device comprising:

a plurality of tensioning units, each of the plurality of tensioning units being assigned to a respective one of a plurality of conveyors of the conveying system rotating about an endless path, each of the plurality of tensioning units being pivotally mounted on a support; and a plurality of rollers, each of the plurality of rollers being rotatably connected to a respective one of the plurality of tensioning units, each of the plurality of rollers engaging the respective conveyor assigned to the respective one of the plurality of tensioning units, wherein each of the plurality of tensioning units pivotally mounted on the support rotates into a visually apparent position when the respective conveyor assigned to the respective one of the plurality of tensioning units fails.

2. The device according to claim 1, wherein the plurality of tensioning units are mounted on the support spaced apart from each other.

3. The device according to claim 1, wherein each of the plurality of tensioning units adopts a first position in an operative state.

4. The device according to claim 1, wherein each of the plurality of tensioning units adopts the visually apparent position when the respective conveyor assigned to the respective one of the plurality of tensioning units fails.

5. The device according to claim 1, wherein the support includes a stop to keep each of the plurality of tensioning units in the visually apparent position when the respective conveyor assigned to the respective one of the plurality of tensioning units fails.

6. The device according to claim 1, wherein each of the plurality of tensioning units includes a pneumatic cylinder connected to a regulated air pressure source.

7. The device according to claim 1, wherein each of the plurality of tensioning units further includes a rod disposed between a first portion of each tensioning unit and the respective roller, the respective rod having a nonrotating cross-sectional interface with respect to the respective first portion to maintain the respective roller in a plane of the respective one of the plurality of conveyors.

8. A device for tensioning a conveying system for conveying flat products in a folding apparatus, the device comprising:

a plurality of tensioning units, each of the plurality of tensioning units being assigned to a respective one of a plurality of conveyors of the conveying system rotating about an endless path; and a plurality of rollers, each of the plurality of rollers being rotatably connected to a respective one of the plurality of tensioning units, each of the plurality of rollers engaging the respective conveyor assigned to the respective one of the plurality of tensioning units, wherein each of the plurality of tensioning units is pivotally mounted on a support to rotate into a visually apparent position when the respective conveyor assigned to the respective one of the plurality of tensioning units fails.

* * * * *